(12) United States Patent
Fujdala et al.

(10) Patent No.: US 7,517,826 B2
(45) Date of Patent: *Apr. 14, 2009

(54) ENGINE EXHAUST CATALYSTS CONTAINING ZEOLITE AND ZEOLITE MIXTURES

(75) Inventors: Kyle L. Fujdala, San Jose, CA (US); Timothy J. Truex, Oxnard, CA (US)

(73) Assignee: Nanostellar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/942,712

(22) Filed: Nov. 20, 2007

(65) Prior Publication Data

US 2008/0125309 A1    May 29, 2008

Related U.S. Application Data

(60) Provisional application No. 60/867,335, filed on Nov. 27, 2006.

(51) Int. Cl.
*B01J 29/06* (2006.01)

(52) U.S. Cl. .................... 502/60; 502/63; 502/64; 502/66; 502/69; 502/71; 502/74; 502/77; 502/527.13; 502/527.19; 427/419.3

(58) Field of Classification Search ............... 502/71, 502/77, 74, 69, 66, 64, 63, 60, 527.13, 527.19; 427/419.3
See application file for complete search history.

(56) References Cited

U.S. PATENT DOCUMENTS

| | | | |
|---|---|---|---|
| 3,929,965 A | 12/1975 | Kim et al. | |
| 4,048,096 A | 9/1977 | Bissot | |
| 4,053,434 A | 10/1977 | McArthur | |
| 4,136,062 A | 1/1979 | Boudart et al. | |
| 4,369,132 A | 1/1983 | Kinoshita et al. | |
| 4,490,481 A | 12/1984 | Boitiaux et al. | |
| 4,499,301 A | 2/1985 | Murib | |
| 4,533,779 A | 8/1985 | Boitiaux et al. | |
| 4,552,860 A | 11/1985 | Murib | |
| 4,931,419 A | 6/1990 | Blanchard et al. | |
| 5,185,308 A | 2/1993 | Bartley et al. | |
| 5,194,417 A | 3/1993 | Smith et al. | |
| 5,258,340 A | 11/1993 | Augustine et al. | |
| 5,336,802 A | 8/1994 | Smith et al. | |
| 5,665,668 A | 9/1997 | Grigorova et al. | |
| 5,693,586 A | 12/1997 | Nicolau et al. | |
| 5,700,753 A | 12/1997 | Wang et al. | |
| 5,702,675 A | 12/1997 | Takeshima et al. | |
| 5,894,068 A | 4/1999 | Kharas et al. | |
| 5,911,961 A | 6/1999 | Horiuchi et al. | |
| 5,948,377 A | 9/1999 | Sung | |
| 5,977,012 A | 11/1999 | Kharas et al. | |
| 5,989,507 A | 11/1999 | Sung et al. | |
| 6,022,823 A | 2/2000 | Augustine et al. | |
| 6,034,030 A | 3/2000 | Nicolau et al. | |
| 6,087,298 A | 7/2000 | Sung et al. | |
| 6,093,378 A * | 7/2000 | Deeba et al. ............ | 423/213.5 |
| 6,147,027 A | 11/2000 | Miyake et al. | |
| 6,156,927 A | 12/2000 | Halcom et al. | |
| 6,235,255 B1 * | 5/2001 | Kharas ................... | 423/213.5 |
| 6,420,308 B1 | 7/2002 | Khanmamedova | |
| 6,656,873 B2 | 12/2003 | Chaturvedi et al. | |
| 6,685,900 B2 * | 2/2004 | Domesle et al. ......... | 423/213.5 |
| 6,727,097 B2 | 4/2004 | Kumar et al. | |
| 6,740,615 B2 | 5/2004 | Zhou | |
| 6,763,309 B2 | 7/2004 | Kieken et al. | |
| 6,777,571 B2 | 8/2004 | Chaturvedi et al. | |
| 6,794,332 B2 | 9/2004 | Khanmamedova | |
| 6,821,501 B2 | 11/2004 | Matzakos et al. | |
| 6,825,149 B2 | 11/2004 | Khanmamedova | |
| 6,944,202 B2 | 9/2005 | Zuppero et al. | |
| 7,169,735 B2 | 1/2007 | Sagae | |
| 2001/0038812 A1 * | 11/2001 | Yavuz et al. ............ | 423/213.2 |
| 2001/0053340 A1 * | 12/2001 | Noda et al. ............. | 423/213.2 |
| 2003/0108465 A1 * | 6/2003 | Voss et al. .............. | 423/213.2 |
| 2005/0169807 A1 | 8/2005 | Carpenter et al. | |
| 2005/0197244 A1 | 9/2005 | L'Vovich et al. | |
| 2005/0261125 A1 | 11/2005 | Sagae | |

FOREIGN PATENT DOCUMENTS

| | | |
|---|---|---|
| EP | 0 449 423 | 10/1991 |
| EP | 0 707 883 | 4/1996 |
| EP | 1570895 | 7/2005 |
| JP | 09299763 | 11/1997 |
| WO | WO 97/00119 | 1/1997 |
| WO | WO 2005/030382 | 4/2005 |
| WO | WO 2007/001075 | 1/2007 |

OTHER PUBLICATIONS

Beck, et al. "Genesis of Au-Pd Nanoparticles Supported on $SiO_2$: Structure and Catalytic Activity in CO Oxidation" North American Catalysis Society, Cancun Mexico XP002475084, Jun. 2, 2003, pp. 1-2.

* cited by examiner

*Primary Examiner*—Elizabeth D Wood
(74) *Attorney, Agent, or Firm*—Patterson & Sheridan, LLP

(57) ABSTRACT

A multi-layer emission control catalyst exhibits improved CO and HC reduction performance. The bottom layer includes a supported catalyst comprising platinum and palladium particles or palladium and gold particles. The middle layer includes zeolites. The top layer includes a supported catalyst comprising platinum and palladium particles. The use of zeolite mixture in the middle layer further improves CO and HC reduction performance in comparison with using zeolite of a single type. The use of a supported catalyst comprising palladium and gold particles in the bottom layer further improves CO and HC reduction performance in comparison with using a supported catalyst comprising platinum and palladium particles.

18 Claims, 5 Drawing Sheets

ENGINE EXHAUST CATALYSTS CONTAINING ZEOLITE AND ZEOLITE MIXTURES

CROSS-REFERENCE TO RELATED APPLICATIONS

This application claims the benefit of U.S. Provisional Patent Application Ser. No. 60/867,335, filed Nov. 27, 2006, which is herein incorporated by reference.

This application claims priority to the same provisional application as U.S. patent application Ser. No. 11/624,116, filed Jan. 17, 2007, U.S. patent application Ser. No. 11/624,128, filed Jan. 17, 2007, and U.S. patent application Ser. No. 11/942,710, filed Nov. 20, 2007.

BACKGROUND OF THE INVENTION

1. Field of the Invention

Embodiments of the present invention generally relate to supported catalysts containing precious group metals and, more particularly, to engine exhaust catalysts containing zeolite and zeolite mixtures.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as hexachloroplatinic acid in water. The metal salt solution "impregnates" or fills the pores of the support during this process. Following the impregnation, the support containing the metal salt solution would be dried, causing the metal salt to precipitate within the pores. The support containing the precipitated metal salt would then be calcined (typically in air) and, if necessary, exposed to a reducing gas environment (e.g., hydrogen or carbon monoxide) for further reduction to form metal particles. Another process for making supported catalysts involves the steps of contacting a support material with a metal salt solution and reducing the metal ions to metal particles in situ using suitable reducing agents.

Supported catalysts are quite useful in removing pollutants from vehicle exhausts. Vehicle exhausts contain harmful pollutants, such as carbon monoxide (CO), unburned hydrocarbons (HC), and nitrogen oxides (NOx), that contribute to the "smog-effect" that have plagued major metropolitan areas across the globe. Catalytic converters containing supported catalysts and particulate filters have been used to remove such harmful pollutants from the vehicle exhaust. While pollution from vehicle exhaust has decreased over the years from the use of catalytic converters and particulate filters, research into improved supported catalysts has been continuing as requirements for vehicle emission control have become more stringent and as vehicle manufacturers seek to use less amounts of precious metal in the supported catalysts to reduce the total cost of emission control.

U.S. Pat. No. 6,677,264 teaches a catalyst for purifying exhaust gases of a diesel engine, having two functional layers. The first layer has a nitrogen oxide storage function and the second layer, which is in direct contact with the exhaust gas flow, has a hydrocarbon storage function. The second layer is made of zeolites, which include de-aluminized Y-zeolite, zeolite ZSM-5, or de-aluminized mordenite, and mixtures thereof.

SUMMARY OF THE INVENTION

The present invention provides catalysts for treating exhaust gases from an engine containing zeolites, and a method for preparing the same. The engine may be a vehicle engine, an industrial engine, or generally, any type of engine that burns hydrocarbons.

A catalyst according to a first embodiment of the present invention has a three-layer configuration, wherein the middle layer contains zeolite of a single type or a mixture of zeolites of different types. The other layers contain supported precious group metal catalysts. The precious group metal catalysts include platinum and palladium metal particles or palladium and gold metal particles.

A catalyst according to a second embodiment of the present invention includes palladium-gold metal particles supported on an oxide carrier and zeolites of at least one type. The zeolites may be a mixture of beta zeolite and ZSM-5 zeolite. This catalyst may be implemented in a three-layer configuration, with a first layer having the palladium-gold metal particles and a third layer having platinum-palladium particles, and a second layer between the first and third layers having the zeolites.

A method for preparing an emission control catalyst according to an embodiment of the present invention includes the steps of preparing a first washcoat slurry having palladium and gold particles in close contact, preparing a second washcoat slurry having zeolites of at least one type, and coating the first washcoat slurry and the second washcoat slurry separately onto a substrate for the emission control catalyst. This method may further comprise the steps of preparing a third washcoat slurry having platinum and palladium particles in close contact and coating the third washcoat slurry onto the substrate. The steps of coating may be carried out as to form a multi-layer coating on the substrate such that a first layer having the palladium-gold metal particles and a third layer having the platinum-palladium metal particles sandwich a second layer having the zeolites.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different engine exhaust systems in which embodiments of the present invention may be used. The combustion process that occurs in an engine 102 produces harmful pollutants, such as CO, various hydrocarbons, particulate matter, and nitrogen oxides (NOx), in an exhaust stream that is discharged through a tail pipe 108 of the exhaust system.

Figure 1A:
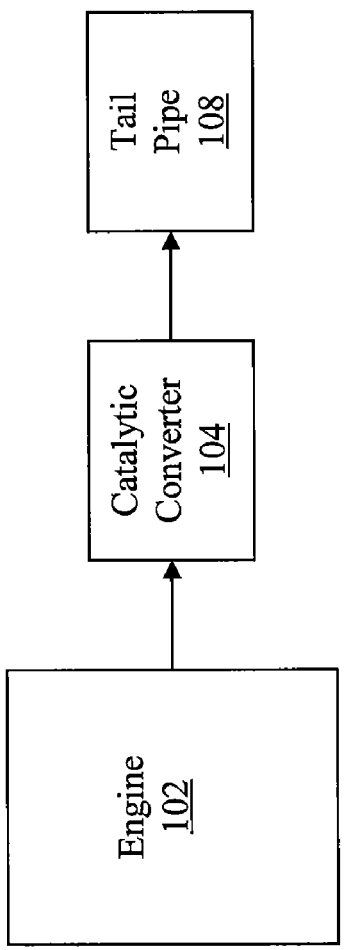
FIGS. 1A-1D are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
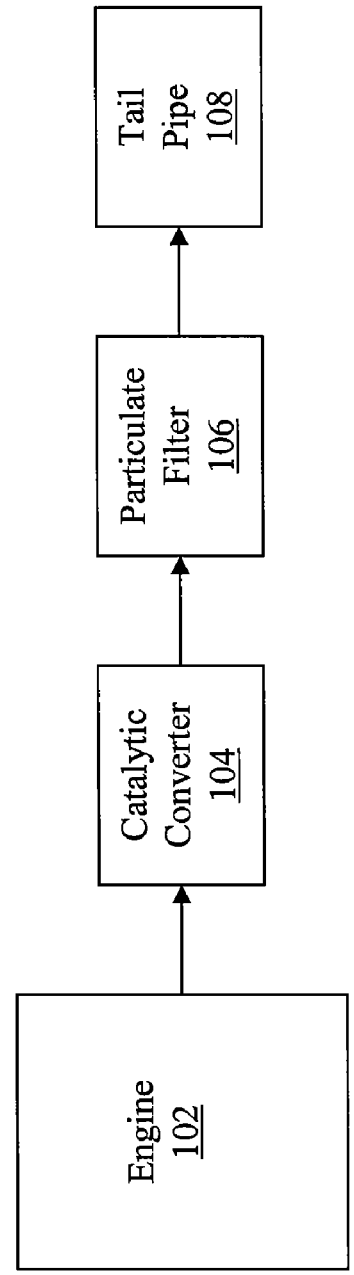

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
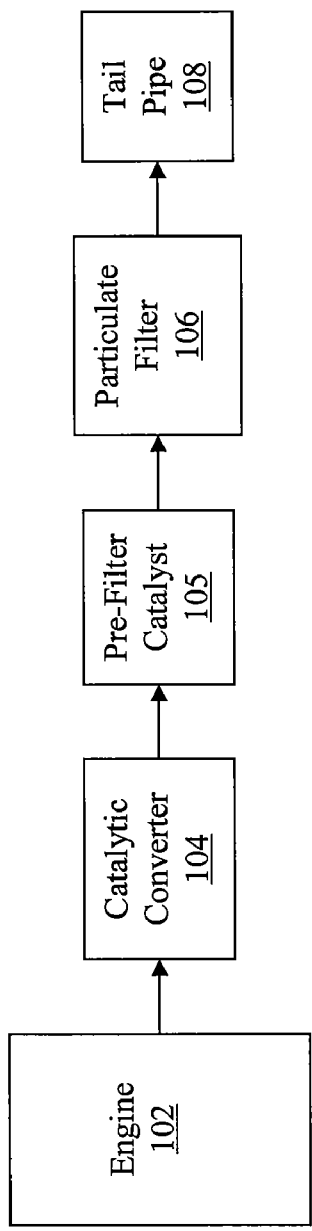

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
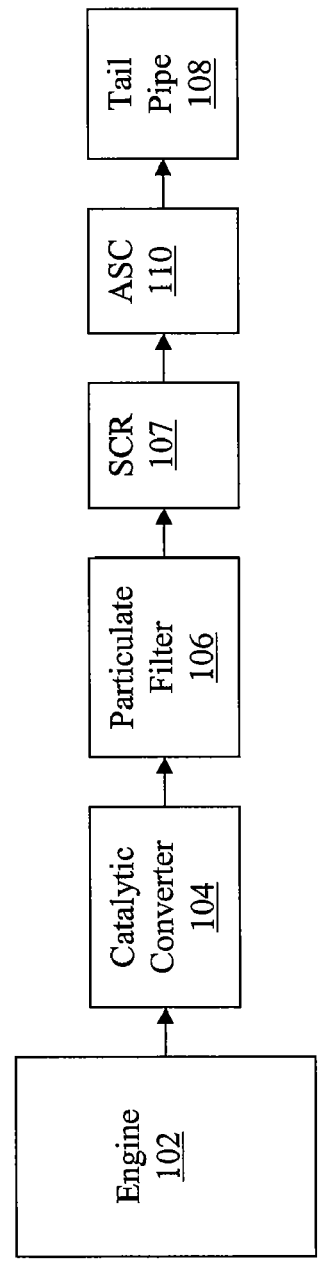

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the $NO_x$ species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C.

As particulates get trapped in the particulate filter within the exhaust system of FIG. 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides catalysts that are to be used in the catalytic converter 104 shown in FIGS. 1A-1D, or generally as catalysts in any vehicle or engine emission control system, including as a diesel oxidation catalyst, a diesel filter catalyst, an ammonia-slip catalyst, an SCR catalyst, or as a component of a three-way catalyst. The present invention further provides a vehicle emission control system, such as the ones shown in FIGS. 1A-1D, comprising an emission control catalyst comprising a monolith and a supported catalyst coated on the monolith.

The emission control catalyst according to embodiments of the present invention includes a monolith with a honeycomb structure that has three washcoat layers. The first washcoat layer, which is disposed directly on the monolith, and the third washcoat layer, which is disposed to directly contact exhaust gases that flow through the honeycomb structure, contain supported precious group metal particles. The second washcoat layer is disposed between the first and third washcoat layers and contains zeolite of a single type, e.g., beta zeolite, or a mixture of zeolites of different types, e.g., a mixture of beta zeolite and ZSM-5 zeolite. Zeolite is included in the catalyst because it captures HC species during cold start conditions when the HC conversion efficiency is low, and as the HC conversion efficiency increases as the temperature of the emission gases rise, the HC species previously captured in the zeolite begins to release.

According to a first embodiment, the precious group metal particles in both the first washcoat layer and the third washcoat layer comprise platinum and palladium, and the second washcoat layer comprises zeolite of a single type, e.g., a beta zeolite or a ZSM-5 zeolite. The weight ratio of platinum to palladium in both washcoat layers is about 0.05:1 to 20:1, preferably from about 2:1 to about 4:1.

According to a second embodiment, the precious group metal particles in both the first washcoat layer and the third washcoat layer comprise platinum and palladium, and the second washcoat layer comprises a mixture of zeolites, e.g., a mixture of beta zeolite and ZSM-5 zeolite having a weight ratio of about 1:1. The weight ratio of platinum to palladium in both washcoat layers is about 0.05:1 to 20:1, preferably from about 2:1 to about 4:1.

According to a third embodiment, the precious group metal particles in the first washcoat layer comprise palladium and gold in close contact and the precious group metal particles in the third washcoat layer comprise platinum and palladium in close contact. The weight ratio of palladium to gold in the first washcoat layer is about 0.05:1 to 20:1, preferably from about 0.5:1 to about 2:1. The weight ratio of platinum to palladium in the third washcoat layer is about 0.05:1 to 20:1, preferably from about 2:1 to about 4:1. The second washcoat layer comprises a mixture of zeolites, e.g., a mixture of beta zeolite and ZSM-5 zeolite having a weight ratio of about 1:1.

Figure 2:
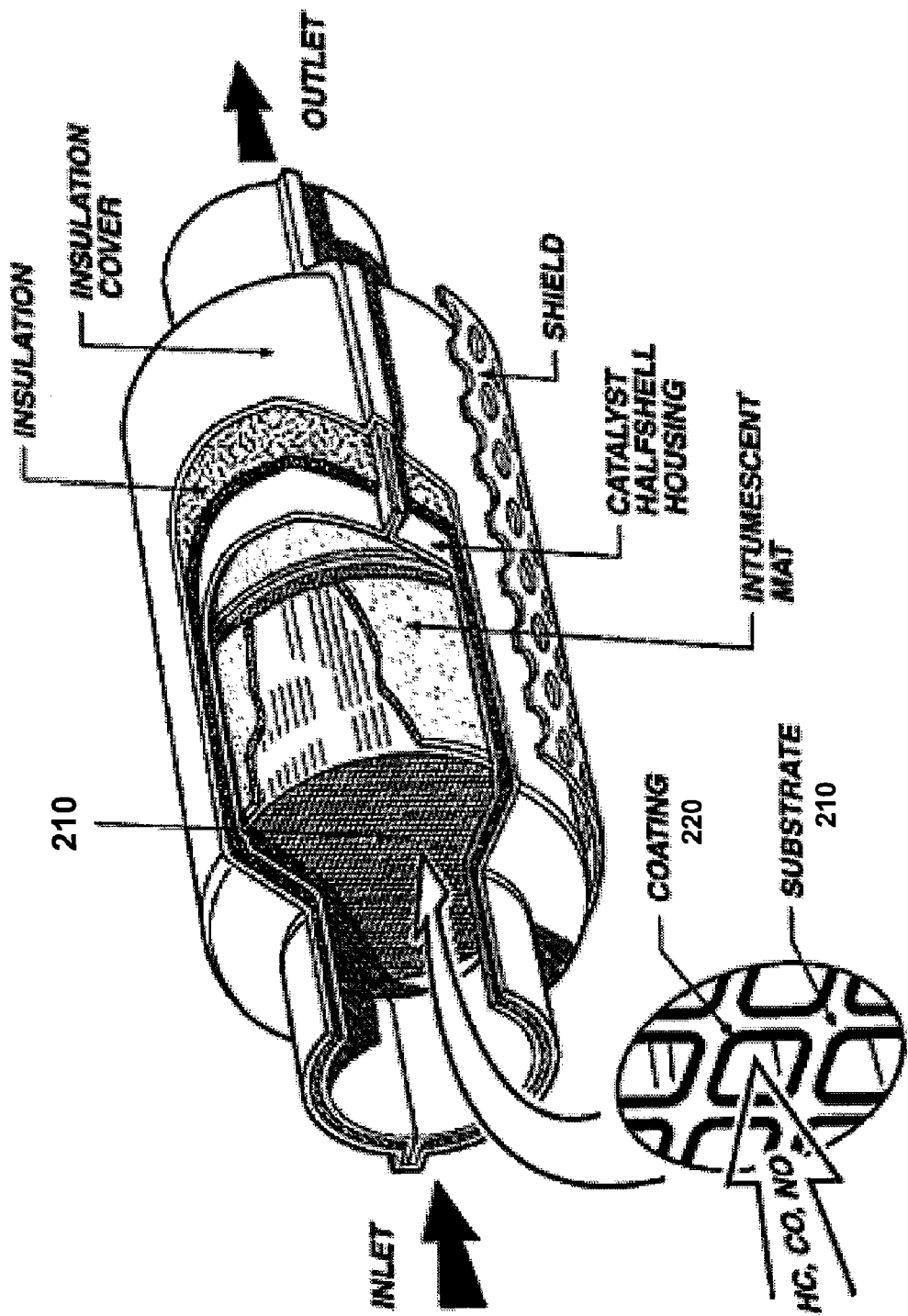
FIG. 2 is an illustration of a catalytic converter with a cut-away section that shows a substrate onto which emission control catalysts according to embodiments of the present invention are coated.

FIG. 2 is an illustration of a catalytic converter with a cut-away section that shows a substrate 210. The exploded view of the substrate 210 shows that the substrate 210 has a honeycomb structure comprising a plurality of channels into which washcoats are flowed in slurry form so as to form coating 220 on the substrate 210.

Figure 3:
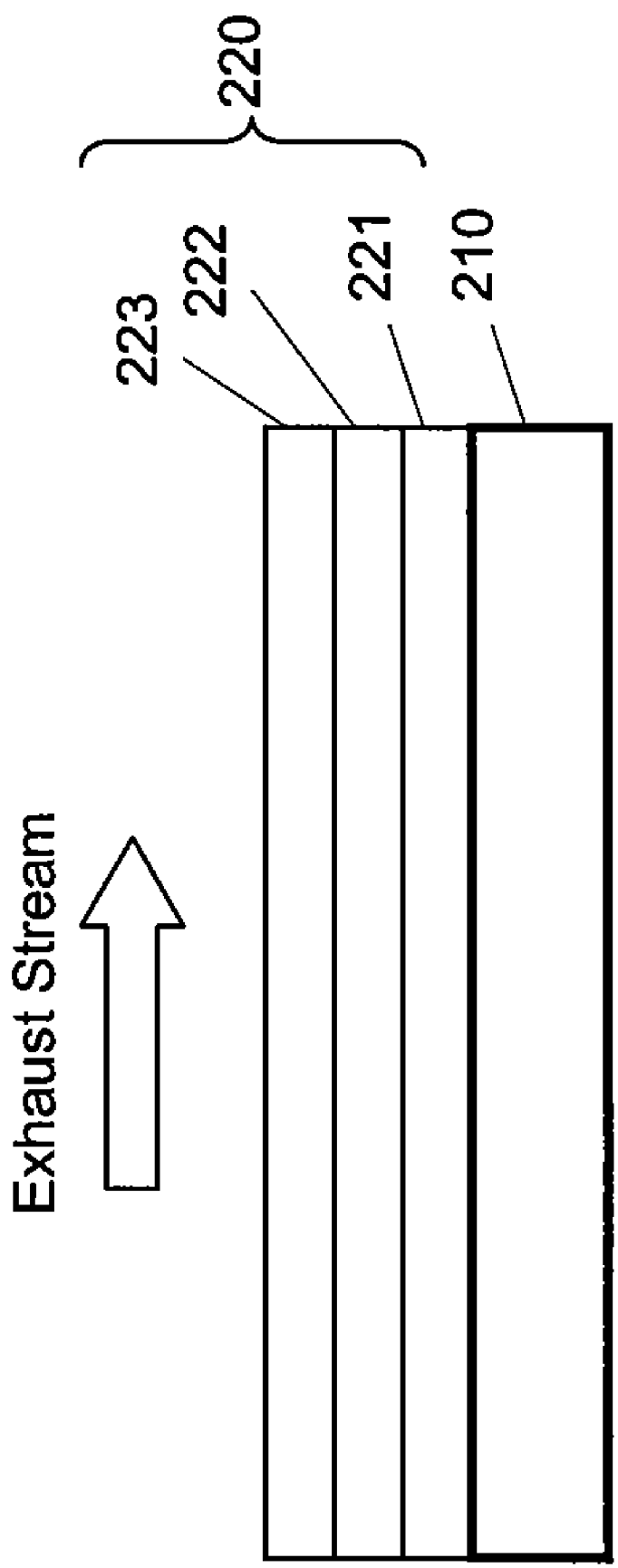
FIG. 3 is a schematic illustration of multiple washcoat layers coated on a substrate for an emission control catalyst.

FIG. 3 is a schematic illustration of multiple washcoat layers 221, 222, 223 that form coating 220 on a substrate 210 for an emission control catalyst. The first washcoat layer 221 is disposed directly on the substrate. The second washcoat layer 222 is disposed directly on the first washcoat layer 221. The third washcoat layer 223 is disposed directly on the second washcoat layer 222, and is in direct contact with the exhaust stream when engine 102 emits exhaust gases.

In additional embodiments of the present invention, any of the washcoat layers 221, 222, 223 may include rare-earth oxides, such as cerium (IV) oxide ($CeO_2$) and ceria-zirconia ($CeO_2$—$ZrO_2$).

Figure 4:
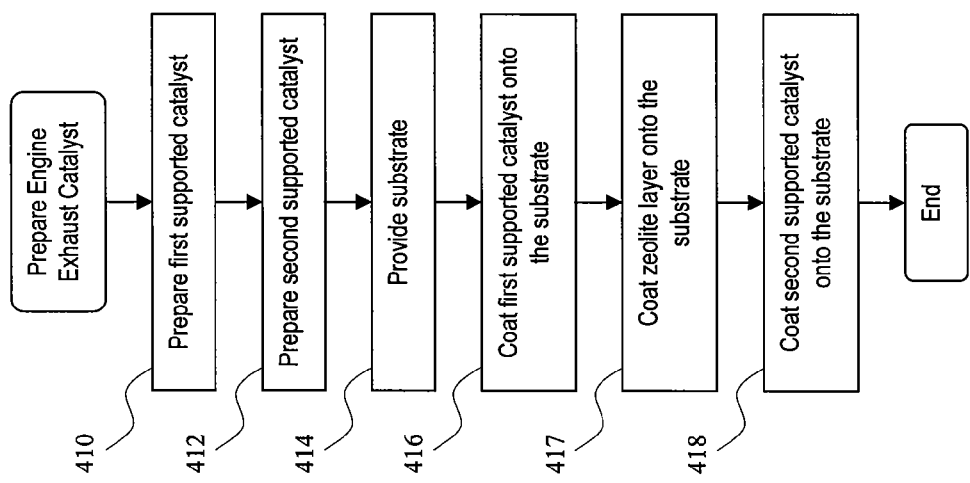
FIG. 4 is a flow diagram illustrating the steps for preparing an emission control catalyst according to an embodiment of the present invention.

FIG. 4 is a flow diagram that illustrates the steps for preparing an emission control catalyst according to an embodiment of the present invention using the substrate 210. In step 410, a first supported catalyst, e.g., supported platinum-palladium catalyst or supported palladium-gold catalyst, is prepared. In step 412, a second supported catalyst, e.g., supported platinum-palladium catalyst, is prepared. A monolithic substrate, such as substrate 210 shown in FIG. 2, is provided in step 414. Exemplary monolithic substrates include those that are ceramic (e.g., cordierite), metallic, or silicon carbide based. In step 416, the first supported catalyst in powder form is mixed in a solvent to form a washcoat slurry and this washcoat slurry is coated onto the substrate as its bottom layer. In step 417, a zeolite of a single type or a zeolite mixture is added to a solvent to form a washcoat slurry and this washcoat slurry is coated onto the substrate as its middle layer. In step 418, the second supported catalyst in powder form is mixed in a solvent to form a washcoat slurry and this washcoat slurry is coated onto the substrate as its top layer.

The data representing vehicle performance of the various embodiments of the present invention are provided in Table 1 below.

TABLE 1

| Example | Bottom Layer | Middle Layer | Top Layer | CO emissions (g/km) | HC emissions (g/km) |
|---|---|---|---|---|---|
| Benchmark | PtPd (2:1 by weight) at 115.0 g/ft$^3$ | N/A | N/A | 0.368 | 0.107 |
| 1 | PtPd (2:1 by weight) at 57.5 g/ft$^3$ | Beta zeolite at 0.5 g/in$^3$ | PtPd (2:1 by weight) at 57.5 g/ft$^3$ | 0.366 | 0.079 |
| 2 | PtPd (2:1 by weight) at 57.5 g/ft$^3$ | Beta zeolite and ZSM-5 zeolite (1:1 by weight) | PtPd (2:1 by weight) at 57.5 g/ft$^3$ | 0.332 | 0.066 |
| 3 Test A | PdAu (1.7:2.0 by weight) at 65 g/ft$^3$ | Beta zeolite and ZSM-5 zeolite (1:1 by weight) | PtPd (4:1 by weight) at 65.0 g/ft$^3$ | 0.296 | 0.049 |
| 3 Test B | PdAu (1.7:2.0 by weight) at 65 g/ft$^3$ | Beta zeolite and ZSM-5 zeolite (1:1 by weight) | PtPd (4:1 by weight) at 65.0 g/ft$^3$ | 0.296 | 0.057 |

The data presented in Table 1 above reflect the vehicle test performance for four catalysts with equal precious group metal cost (assuming cost basis of Pt:Pd:Au of 4:1:2) that have been engine aged for 20 hours (with a two-mode cycle using fuel injection to get catalyst bed temperatures of about 650° C.). The CO and HC emissions were measured from the tail pipe of a light-duty diesel vehicle (model year 2005) using bag data from the standard European MVEG test. Low sulfur fuel (less than 50 ppm) was used in the vehicle tests. The catalysts were coated on cordierite substrates with a diameter of 5.66 inches by 2.5 inches.

Relative to the benchmark emission control catalyst, a reduction in HC emissions is observed by the use of zeolite in the middle layer of a three-layer catalyst (Example 1). A reduction in both CO and HC emissions is observed when a zeolite mixture is used in the middle layer of a three-layer catalyst in place of zeolite of a single type (Example 2).

Reductions in HC emissions as a result of using zeolite as a top layer of a two-layer catalyst, where the zeolite-containing layer is in direct contact with the exhaust flow, have been reported in U.S. Pat. No. 6,677,264. The present inventors have discovered that the zeolite-containing layer need not be in direct contact with the exhaust flow to achieve a reduction in HC emissions, and that reductions in HC emissions can be achieved by situating the zeolite-containing layer as the middle layer of a three-layer catalyst. Although it might be expected that the trapping of hydrocarbons by the zeolite-containing layer may be less efficient because it is not in direct contact with the exhaust flow, the overall HC conversion may not be affected, because the trapped hydrocarbons, upon their release from the zeolite, are released between the two catalytically active layers. In addition, better washcoat adhesion may be achieved if the zeolite-containing layer is the middle layer.

The use of zeolite in combination with an emission control catalyst containing palladium-gold metal particles leads to a further reduction in both CO and HC emissions (Example 3). The inventors have discovered that the oxidation activity of a palladium-gold catalyst can be enhanced in an emission control application when the inhibition effects of HC are minimized. In this example, zeolite is used to minimize the HC inhibition effects, because zeolite acts as a hydrocarbon trap at low temperatures when the HC conversion efficiency is low.

The preparation methods for the benchmark catalyst and Examples 1-3 were as follows:

Preparation of a 2.8% Pt, 1.4% Pd Supported Catalyst.

To 10 L of de-ionized $H_2O$ was added 1940 g of La-stabilized alumina (having a BET surface area of ~200 $m^2$ $g^{-1}$) followed by stirring for 30 minutes at room temperature. To this slurry was added 490.6 g of $Pt(NO_3)_2$ solution (12.23% $Pt(NO_3)_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt material.

To 9.25 L of de-ionized $H_2O$ was added 1822 g of the above 3% Pt material followed by stirring for 20 minutes at room temperature. To this slurry was added 194.4 g of $Pd(NO_3)_2$ solution (14.28% $Pd(NO_3)_2$ by weight), followed by stirring at room temperature for 60 minutes. An aqueous ascorbic acid solution (930 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt, 1.5% Pd material. This material was diluted to 2.8% Pt, 1.4% Pd via addition of blank La-doped alumina support and the diluted mixture was used in preparing the benchmark catalyst, and Examples 1 and 2.

Preparation of a 3.0% Pt, 0.75% Pd Supported Catalyst.

To 10 L of de-ionized $H_2O$ was added 2000 g of La-stabilized alumina (having a BET surface area of ~200 $m^2$ $g^{-1}$) followed by stirring for 30 minutes at room temperature. To this slurry was added 654.2 g of $Pt(NO_3)_2$ solution (12.23% $Pt(NO_3)_2$ by weight), followed by stirring at room temperature for 60 minutes. Acrylic acid (500 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 4% Pt material.

To 9.5 L of de-ionized $H_2O$ was added 3800 g of the above 4% Pt material followed by stirring for 20 minutes at room temperature. To this slurry was added 135.3 g of $Pd(NO_3)_2$ solution (14.28% $Pd(NO_3)_2$ by weight), followed by stirring at room temperature for 60 minutes. An aqueous ascorbic acid solution (647.2 g in 3.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 4% Pt, 1% Pd material. This material was diluted to 3.0% Pt, 0.75% Pd via addition of blank La-doped alumina support and the diluted mixture was used in preparing Example 3.

Preparation of a 1.7% Pd, 2.0% Au Supported PdAu Catalyst.

Lanthanum-stabilized alumina (578 g, having a surface area of ~200 $m^2$ $g^{-1}$) and 2940 mL of de-ionized water (>18MΩ) were added to a 5 L plastic beaker and magnetically stirred at about 500 rpm. The pH measured was 8.5 and the temperature measured was 25° C. After 20 minutes, $Pd(NO_3)_2$ (67.8 g of 14.8% aqueous solution) was gradually added over a period of 10 min. The pH measured was 4.3. After stirring for 20 minutes, a second metal, $HAuCl_4$ (24 g dissolved in 50 mL of de-ionized water), was added over a period of 5 min. The pH was 4.0 and the temperature of the metal-support slurry was 25° C. The metal-support slurry was stirred for an additional 30 min. In a second vessel, $NaBH_4$ (29.4 g) and NaOH (31.1 g) were added to $N_2H_4$ (142 mL of 35% aqueous solution) and stirred until the mixture became clear. This mixture constituted the reducing agent mixture. The metal-support slurry and reducing agent mixture were combined continuously using two peristaltic pumps. The two streams were combined using a Y joint connected to a Vigreux column to cause turbulent mixing. The reaction product leaving the mixing chamber, i.e., the Vigreux column, was pumped into an intermediate vessel of smaller volume and continuously stirred. The product in the intermediate vessel was continuously pumped into a larger vessel, i.e., 5 L beaker, for residence and with continued stirring. The entire addition/mixing process lasted about 30 min. The resulting product slurry was stirred in the larger vessel for an additional period of 1 h. The final pH was 11.0 and the temperature was 25° C. The product slurry was then filtered using vacuum techniques via Buchner funnels provided with a double layer of filter paper having 3 µm porosity. The filter cake was then washed with about 20 L of de-ionized water in several approximately equal portions. Thereafter, the washed cake was dried at 110° C., ground to a fine powder using a mortar and pestle, and subsequently calcined at 500° C. for 2 h, with a heating rate of 8° C. $min^{-1}$. This supported PdAu catalyst powder (1.7% Pd, 2.0% Au) was used in preparing Example 3.

Benchmark—Single Layer: PtPd (at 115 $g/ft^3$).

The supported PtPd catalyst powder (2.8% Pt, 1.4% Pd) prepared as described above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give a single-layer coated monolith, such that the PtPd loading was ~115 g/ft$^3$.

EXAMPLE 1

Tri-layer: PtPd (at 57.5 g/ft$^3$) 1st Layer, Beta Zeolite 2nd Layer, PtPd (at 57.5 g/ft$^3$) 3rd Layer The supported PtPd catalyst powder (2.8% Pt, 1.4% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the first layer of the multi-layer coated monolith, such that the PtPd loading was ~57.5 g/ft$^3$.

Then, beta zeolite was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. The zeolite mixture comprises about 20% of the total washcoat loading.

Then, the supported PtPd catalyst powder (2.8% Pt, 1.4% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto the cordierite monolith (with the first layer of PtPd and the second layer of zeolite), dried at 120° C. and calcined at 500° C. to give the third layer of the multi-layer coated monolith, such that the PtPd loading was ~57.5 g/ft$^3$.

The multi-layer coated monolith was canned according to methods known in the art and tested using a certified testing facility on a light-duty diesel vehicle, as described above.

EXAMPLE 2

Tri-layer: PtPd (at 57.5 g/ft$^3$) 1st Layer, Zeolite Mixture 2nd Layer, PtPd (at 57.5 g/ft$^3$) 3rd Layer The supported PtPd catalyst powder (2.8% Pt, 1.4% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the first layer of the multi-layer coated monolith, such that the PtPd loading was ~57.5 g/ft$^3$.

Then, equal weight amounts of a beta zeolite and a ZSM-5 zeolite were combined and made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. The zeolite mixture comprises about 20% of the total washcoat loading.

Then, the supported PtPd catalyst powder (2.8% Pt, 1.4% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto the cordierite monolith (with the first layer of PtPd and the second layer of zeolite), dried at 120° C. and calcined at 500° C. to give the third layer of the multi-layer coated monolith, such that the PtPd loading was ~57.5 g/ft$^3$.

The multi-layer coated monolith was canned according to methods known in the art and tested using a certified testing facility on a light-duty diesel vehicle, as described above.

EXAMPLE 3

PdAu (at 65 g/ft$^3$) 1st Layer, Zeolite Mixture 2nd Layer, PtPd (at 65 g/ft$^3$) 3rd Layer The supported PdAu catalyst powder (1.7% Pd, 2.0% Au) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the first layer of the multi-layer coated monolith, such that the PdAu loading was ~65 g/ft$^3$.

Then, equal weight amounts of a beta zeolite and a ZSM-5 zeolite were combined and made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the zeolite washcoat slurry was coated onto the cordierite monolith (with the first layer of PtPd), dried at 120° C. and calcinated at 500° C. to give the second layer of the multi-layer coated monolith. The zeolite mixture comprises about 20% of the total washcoat loading.

Then, the supported PtPd catalyst powder (3.0% Pt, 0.75% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto the cordierite monolith (with the first layer of PdAu and the second layer of zeolite), dried at 120° C. and calcined at 500° C. to give the third layer of the multi-layer coated monolith, such that the PtPd loading was ~65 g/ft$^3$.

The multi-layer coated monolith was canned according to methods known in the art and tested using a certified testing facility on a light-duty diesel vehicle, as described above.

While particular embodiments according to the invention have been illustrated and described above, those skilled in the art understand that the invention can take a variety of forms and embodiments within the scope of the appended claims.

What is claimed is:

1. An emission control catalyst comprising a substrate having first, second, and third washcoat layers coated thereon in a multi-layer configuration, wherein the first and third washcoat layers include supported precious group metal particles and the second washcoat layer is between the first washcoat layer and the third washcoat layer and contains zeolites of at least one type.

2. The emission control catalyst according to claim 1, wherein the zeolites of at least one type comprises beta zeolite.

3. The emission control catalyst according to claim 1, wherein the zeolites of at least one type comprises a mixture of beta zeolite and ZSM-5 zeolite.

4. The emission control catalyst according to claim 3, wherein a weight ratio of the beta zeolite and the ZSM-5 zeolite in the second washcoat layer is approximately 1:1.

5. The emission control catalyst according to claim 1, wherein the substrate has a honeycomb structure with gas flow channels, and the first, second, and third washcoat layers are coated on the walls of the gas flow channels.

6. The emission control catalyst according to claim 5, wherein the first washcoat layer is disposed directly on the walls of the gas flow channels and the third washcoat layer is disposed to be in direct contact with exhaust gases flowing through the gas flow channels.

7. The emission control catalyst according to claim 6, wherein the first washcoat layer comprises supported platinum-palladium metal particles, and the second washcoat layer comprises beta zeolite, and the third washcoat layer comprises supported platinum-palladium metal particles.

8. The emission control catalyst according to claim 6, wherein the first washcoat layer comprises supported platinum-palladium metal particles, and the second washcoat layer comprises a mixture of beta zeolite and ZSM-5 zeolite, and the third washcoat layer comprises supported platinum-palladium metal particles.

9. The emission control catalyst according to claim 6, wherein the first washcoat layer comprises supported palladium-gold metal particles, and the second washcoat layer comprises a mixture of beta zeolite and ZSM-5 zeolite, and the third washcoat layer comprises supported platinum-palladium metal particles.

10. The emission control catalyst according to claim 1, wherein the supported precious group metal particles comprises palladium and gold particles in close contact.

11. An emission control catalyst comprising:
a substrate having first, second, and third washcoat layers coated thereon in a multi-layer configuration,
wherein the first washcoat layer comprises supported platinum-palladium metal particles, and the third washcoat layer comprises supported platinum-palladium metal particles, and
wherein the second washcoat layer is between the first washcoat layer and the third washcoat layer and contains zeolites of at least one type.

12. The emission control catalyst according to claim 11, wherein the first washcoat layer is disposed on the substrate, the second washcoat layer on the first washcoat layer, and the third washcoat layer on the second washcoat layer.

13. The emission control catalyst according to claim 12, wherein the zeolites of at least one type comprises beta zeolite.

14. The emission control catalyst according to claim 12, wherein the zeolites of at least one type comprises a mixture of beta zeolite and ZSM-5 zeolite.

15. An emission control catalyst comprising:
a substrate having first, second, and third washcoat layers coated thereon in a multi-layer configuration,
wherein the first washcoat layer comprises supported palladium-gold metal particles, and the third washcoat layer comprises supported platinum-palladium metal particles, and
wherein the second washcoat layer is between the first washcoat layer and the third washcoat layer and contains zeolites of at least one type.

16. The emission control catalyst according to claim 15, wherein the first washcoat layer is disposed on the substrate, the second washcoat layer on the first washcoat layer, and the third washcoat layer on the second washcoat layer.

17. The emission control catalyst according to claim 16, wherein the zeolites of at least one type comprises beta zeolite.

18. The emission control catalyst according to claim 16, wherein the zeolites of at least one type comprises a mixture of beta zeolite and ZSM-5 zeolite.

* * * * *